(12) United States Patent
Dong et al.

(10) Patent No.: US 7,046,278 B1
(45) Date of Patent: May 16, 2006

(54) AUTO BLACK EXPANSION METHOD AND APPARATUS FOR AN IMAGE SENSOR

(75) Inventors: Kimble Dong, Sunnyvale, CA (US); Datong Chen, Fremont, CA (US)

(73) Assignee: OmniVision Technologies, Inc., Sunnyvale, CA (US)

( * ) Notice: Subject to any disclaimer, the term of this patent is extended or adjusted under 35 U.S.C. 154(b) by 504 days.

(21) Appl. No.: 09/399,510

(22) Filed: Sep. 20, 1999

(51) Int. Cl.
*H04N 5/235* (2006.01)
*H04N 5/217* (2006.01)

(52) U.S. Cl. .................................. 348/229.1; 348/241

(58) Field of Classification Search ............. 348/229.1, 348/230.1, 241, 243
See application file for complete search history.

(56) References Cited

U.S. PATENT DOCUMENTS

| 4,187,519 | A |   | 2/1980 | Vitols et al. |         |
|-----------|---|---|--------|---------------|---------|
| 5,086,343 | A | * | 2/1992 | Cook et al.   | 348/247 |
| 5,345,266 | A |   | 9/1994 | Denyer        | 348/300 |
| 5,781,233 | A | * | 7/1998 | Liang et al.  | 348/302 |
| 6,597,395 | B1| * | 7/2003 | Kim et al.    | 348/222.1 |

OTHER PUBLICATIONS

H. Kawashima et al., "A ¼ Inch Format 250K Pixel Amplified MOS Image Sensor Using CMOS Process," *IEDM 93*, pp. 575-578 (1993).

T. Ozaki et al., "A Low Noise Line-Amplifier MOS Imaging Device," *IEEE Transactions on Electron Devices*, vol. 38, No. 5, pp. 969-975 (1991).
Parulski, K.A., "Color Filters and Processing Alternatives for One-Chip Cameras," *IEEE Transactions on Electron Devices*, ED-32 No. 8:1381-1389 (1985).
Imaide, T. et al., "Single-Chip Color Cameras with Reduced Aliasing," *Journal of Imaging Technology*, 12, No. 5:258-260 (1986).

* cited by examiner

*Primary Examiner*—Tuan Ho
*Assistant Examiner*—Justin Misleh
(74) *Attorney, Agent, or Firm*—Perkins Coie LLP

(57) ABSTRACT

Auto black expansion circuitry with a simplified digital control system. According to the system, a count of the number of pixels that fall below desired black level and mid-level ranges are maintained. The pixel counts are obtained by comparators that receive the adjusted signals at one input and the desired comparator signal levels at the other input. At the end of a field, when the pixel counts are complete, adjustment to the auto black expansion may be made for the following field. Once the pixel count at the end of a given field indicates that the auto black expansion has achieved the desired level, the automatic gain control may be adjusted for the following field. The method uses single comparators and single counters to obtain the pixel counts. The digital controller outputs an 8-bit control signal to adjust the analog auto black expansion and automatic gain control circuits to precise levels.

6 Claims, 8 Drawing Sheets

AUTO BLACK EXPANSION METHOD AND APPARATUS FOR AN IMAGE SENSOR

FIELD OF THE INVENTION

The present invention relates to metal oxide semiconductor (MOS) image sensors and, more particularly, to auto black expansion systems in such image sensors.

BACKGROUND OF THE INVENTION

Integrated circuit technology has revolutionized various fields, including computers, control systems, telecommunications, and imaging. One field in which integrated circuitry is widely used is video imaging. Different types of semiconductor imagers include: charge coupled devices, photodiode arrays, charge injection devices, and hybrid focal plane arrays. Many of these devices include pixels that are arranged in sensor arrays to convert light images into electrical signals.

Examples of MOS imaging devices are detailed in "A ¼ Inch Format 250K Pixel Amplified MOS Image Sensor Using CMOS Process" by Kawashima et al., IEDM 93–575 (1993), and "A Low Noise Line-Amplified MOS Imaging Devices" by Ozaki et al., *IEEE Transactions on Electron Devices*, Vol. 38, No. 5, May 1991. In addition, U.S. Pat. No. 5,345,266 to Denyer, titled "Matrix Array Image Sensor Chip," describes a MOS image sensor. The devices disclosed in these publications provide a general design approach to MOS imaging devices. In addition, MOS approaches to color imaging devices are described in "Color Filters and Processing Alternatives for One-Chip Cameras," by Paruiski, *IEEE Transactions on Electron Devices*, Vol. ED-32, No. 8, August 1985, and "Single-Chip Color Cameras With Reduced Aliasing" by Imaide et al., *Journal of Imaging Technology*, Vol. 12, No. 5, October 1986, pp. 258–260.

Image sensor circuitry generally includes circuits for performing black level calibration and automatic gain control. Black level calibration attempts to eliminate the portion of the image signal that exists when no light is being detected, thus allowing for a truer zero reference signal so that the later signal processing is improved. After the black level calibration has been performed, automatic gain control amplifies the video signal at a controlled level so as to utilize more of the available signal amplification range. The combination of the black level calibration and automatic gain control can be said to form one type of an "auto black expansion" method. One prior art circuit that addresses issues related to these processes is shown in U.S. Pat. No. 4,187,519 to Vitols et al. FIGS. 1, 2, 3, 4, 5, 6 and 7 of Vitols et al. have been reproduced herein as FIGS. 1, 2A, 2B, 2C, 2D, 2E, and 2F, respectively.

Vitols et al. disclose a circuit that is designed to provide a video contrast expansion system. As illustrated in FIG. 1, a sequence of video pixel data representative of an image is developed by a signal source 11, which may be, for example, a radar, an IR (infrared) sensor or a TV (television) camera. This pixel data is applied to an I-getter (intensity getter) 13 and to a delay circuit 19. An initialize command signal from the source 11 initializes the operation of the I-getter 13 before or during the time that the sequence of pixels is being generated by the source 11.

The I-getter 13 searches the input sequence of pixels (designated as new data or ND) to determine bias and gain intensity parameters. A bias function generator 15 is automatically adjusted by the bias parameters to develop pixel bias correction signals. In a similar manner a gain function generator 17, which is similar in structure and operation to the generator 15, is automatically adjusted by the gain parameters to develop pixel gain correction signals.

In its operation the I-getter 13 reduces and transforms the input sequence of pixels into a reduced number of bias parameters and a reduced number of gain parameters. Each of the function generators 15 and 17 smoothly fills in or shades in its associated widely spaced apart parameters (bias or gain) by double linear interpolations to produce its associated correction signals (bias or gain). Each sequence of correction signals is equal to the number of pixels in the input sequence of pixels.

It takes time for each of the function generators 15 and 17 to get sufficient parameter data in before it can start computing its associated correction signals. Furthermore, it takes additional time before each of the function generators 15 and 17 compute its associated correction signals. This combined delay time is offset by the delay circuit 19 which synchronizes the time of occurrence of the sequence of pixels at the output of the delay circuit 19 with the time of generation of the pixel bias correction signals and pixel gain correction signals.

The computed pixel bias correction signals are respectively subtracted in a combiner or subtractor 21 from the delayed or synchronized sequence of pixels to selectively lower the minimum values in associated groups of pixels in the delayed sequence of pixels to very close to zero. The minimized output of the combiner 21 is respectively multiplied in a multiplier or AGC (automatic gain control) circuit 23 to selectively expand the maximum amplitudes in the associated groups of pixels at the output of the combiner 21 to near the saturation level of the electronics of the system of FIG. 1. The output of the AGC circuit 23 can be applied to a display generator (not shown) to generate an enhanced picture of the image in which the video contrast of the image has been substantially expanded in two directions (minimum and maximum values of contrast).

The pixel data at the output of the signal source 11 may have a very narrow dynamic range of contrast, making it extremely difficult to discern objects in areas of lower contrast if directly viewed at the point. However, by the operation just explained, the pixel data at the output of the AGC circuit 23 has its dynamic range of contrast selectively expanded or stretched from near minimum to near maximum, making objects originally in low areas of contrast now clearly discernible when displayed.

FIGS. 2A–2F illustrate some of the possible operations that the circuit of FIG. 1 can perform on a one-dimensional signal. Such operations are analogous to those performed on a two-dimensional signal since a two-dimensional signal is essentially comprised of a vertical plurality of horizontal one-dimensional signals.

FIG. 2A illustrates an exemplary one-dimensional signal I(x) comprised of a sequence of 256 pixels. Although I(x) is shown as an analog signal it is a sequence of 256 intensity (I) points of varying amplitudes. Note that $I_{(x)}$ varies over a fairly wide intensity range from an amplitude of 630 ($I_{sat}$ or the intensity saturation level of the system) to an amplitude of about 50 at the low end.

It may be desired in some applications to look for small, rather than large, amplitude deviations from nominal. For example, if the intensity variations in the incoming signals I(x) of FIG. 2 represent pixels or intensity points of a scene, very high intensity portions of I(x) would ultimately develop very bright portions in a picture, and very low intensity portions of I(x) would ultimately develop very dark portions of the picture. However, a human observer or operator may not necessarily be interested in very high or very low intensity levels in the incoming signal I(x). Rather, an observer may only be interested in small variations of intensity in I(x), whether contained in very high, very low and/or intermediate levels of intensity in I(x). This is due to the fact that the small variations of intensity in I(x) can define the details of a scene or image sufficiently to possibly enable an observer to identify what is happening or contained in the picture.

By using a conventional contrast enhancement technique, an observer may be unable to discern what is contained in picture areas of small intensity variations. It is to the correction of this problem that the circuit of FIG. 1 is directed. To illustrate, assume that the low intensity region of pixels between 100 and 200 in FIG. 2 represents the signal that is coming from the inside of a dark cave. The brightest pixel in the 100–200 region of pixels is dark in comparison with the other high intensity or bright pixels in FIG. 2. An observer may be looking for the glint of light on a gun barrel inside that cave. If the dynamics of the signal in that 100–200 pixel region remain unchanged, an observer would not be able to see that glint of light on that gun barrel. However, if the gain of the signal in the 100–200 pixel region (where the amplitude of the signal is very low) could be increased so that variations of the signal show up to substantially the fullest extent possible without saturating the electronics of FIG. 1, the human observer could more readily determine what was inside the cave. It should be noted that a resultant picture would not look like a normal picture since the inside of the cave would be just as bright as what surrounds the cave on the outside. However, the intent of the circuit of FIG. 1 is to brighten everything to the fullest dynamic range, so that an observer can see what is happening or contained in a resultant picture.

FIG. 2B illustrates a possible guide as to what may be done to increase the dynamic range of I(x) of FIG. 2A. As shown, FIG. 2B illustrates a plurality of eight local data regions, each 32 pixels in length, which respectively encompass contiguous 32-pixel long portions of I(x). In each data region the brightest (or largest intensity) and darkest (or smallest intensity) parts of the associated portion of I(x) are determined. The largest and smallest intensity values found in each data region are used to form horizontal ceiling (C) and floor (F) values for each pixel across that region. Thus, the sequence of ceiling values found in the respective data regions forms a ceiling function of X values, designated C(x), while the sequence of floor values found in the respective data regions forms a floor function of X values, designated F(x), for the included portions of I(x). FIG. 2C shows just F(x) the floor function of FIG. 2B. As shown, F(x) is comprised of the segmented sequence of minimum values across the respective regions of FIG. 2B.

As described, a first possible operation that can be performed to maximize the dynamic range of I(x) is to subtract F(x) from I(x) to produce the wave form shown in FIG. 2D. It can be seen in FIG. 2D that the amplitude of the signal I(x) of FIG. 2A is substantially reduced, while still substantially retaining the intensity variations of FIG. 2A.

As also described, the next possible operation that can be performed is to expand the amplitude of the signal I(x)–F(x) of FIG. 2D by adjusting the gain in the first data region (0–32), second data region (32–64), third data region (64–96) etc.—each gain adjustment being independent of the others-so that the maximum value of the signal in each data region go all the way up to the maximum permissible level or saturation level ($I_{sat}$) FIG. 2E illustrates a piecewise constant gain function G(x) that would independently adjust the amplitude in each segment or data region up to the saturation level. This piecewise constant gain function would be determined by the value of the saturation intensity ($I_{sat}$) divided by the difference between the C(x) and F(x) functions.

FIG. 2F illustrates the result of multiplying the function of FIG. 2D by the gain function of FIG. 2E. This multiplication raises the maximum value in each data region up to the saturation level. However, Vitols et al. describe FIG. 2F as being very unsatisfactory because of the discontinuities or, places where the amplitude of the signal rises or falls vertically. Although the full dynamic range of the signal is obtained in each data region, the resultant signal shown in FIG. 2F is very bumpy. So the overall information that an operator may be looking for in the signal may be totally lost in the discontinuities. If the one-dimensional wave form of FIG. 2F were applied to a two-dimensional picture, a very strong checkerboard pattern would result, which would distort the operator's perception of a picture or image to the point where he probably could not discern what he was looking at. Vitols et al. go on to explain how the discontinuities shown in FIG. 2F can be eliminated by smoothing the signal functions F(x) and G(x) from one data region to another. This smoothing operation is described further in the Vitols et al. patent, but will not be discussed further herein.

One of the drawbacks of the Vitols et al. circuit is that it requires a complex sequence of operations to determine the desired adjustment functions for the system. As described, the I-getter (as illustrated in FIG. 12 of Vitols et al.) requires two shift registers for every data cell used in an output picture. In addition, a large number of switching points capable of switching out each of the data cells for separate comparator operations must be used. In addition, during the comparator operations the comparator voltage level to which the incoming pixel signals are compared may be constantly shifting. In addition, as further described in Vitols et al., it takes time for each of the function generators to get sufficient parameter data in before the function generators can start computing the associated correction signals. Furthermore, it is also stated that it takes additional time before each of the function generators can compute its associated correction signals. This combined delay time must be offset by a delay circuit which synchronizes the time of occurrence of the sequence of pixels with the time of generation of the pixel bias correction signals and pixel gain correction signals.

The present invention is directed to a circuit that overcomes the foregoing and other problems in the prior art. More specifically, the present invention is directed to an auto black expansion method and apparatus for an image sensor that uses a simplified digital control system and does not require additional shift registers for the pixel signals or continual shifting of input comparator levels during a given field.

SUMMARY OF THE INVENTION

A simplified digital control method and apparatus for auto black expansion in an image sensor is disclosed. Within the auto black expansion method, black level calibration is used to eliminate the unused lower portion of the signal range, and automatic gain control is used to amplify the video signal at a controlled level so as to utilize more of the available signal amplification range. In the preferred embodiment, the black level calibration is performed by an auto black expansion circuit, and the gain adjustment is performed by an automatic gain control circuit.

In accordance with one aspect of the invention, the simplified digital control system is based on a count of the number of pixels with signal intensities that occur below selected levels. Preferably, a black level voltage and a mid-level voltage comprise the selected levels to which the pixel intensities are compared. Since the control system is based on a count of pixel intensities below a certain level, objects within the sensed image can move around without generally changing the total pixel count or requiring shifting in the black level or gain adjustment parameters. In addition, the storing of an absolute count provides for simpler processing circuitry and reduces the likelihood of errors that occur when multiple analog signal levels must be stored.

In accordance with another aspect of the invention, for each of the black level and mid-level comparisons, a single comparator can be used to read the output signals from the pixels and store the pixel count in a single counter. This reduces the parts count relative to a method that requires individual storage areas for each pixel in a given field. This also reduces the wiring requirements and control circuit complexity. In addition, these factors also contribute to increasing the speed with which the process as a whole may be performed.

In accordance with another aspect of the invention, precise adjustments may be made to the auto black expansion and automatic game control circuits by using a control signal with a sufficient precision. Preferably, a control signal is used having at least eight bits. The level of adjustment may be based on a calculation of the difference between the counted number of pixels below a selected level and the desired number of pixels.

In accordance with another aspect of the invention, an adjustment to the auto black expansion or the automatic gain control is made at the end of each field. By making the adjustments in between fields, linear amplification is maintained within a given field and the chances for processing errors during a given field are reduced.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 3:
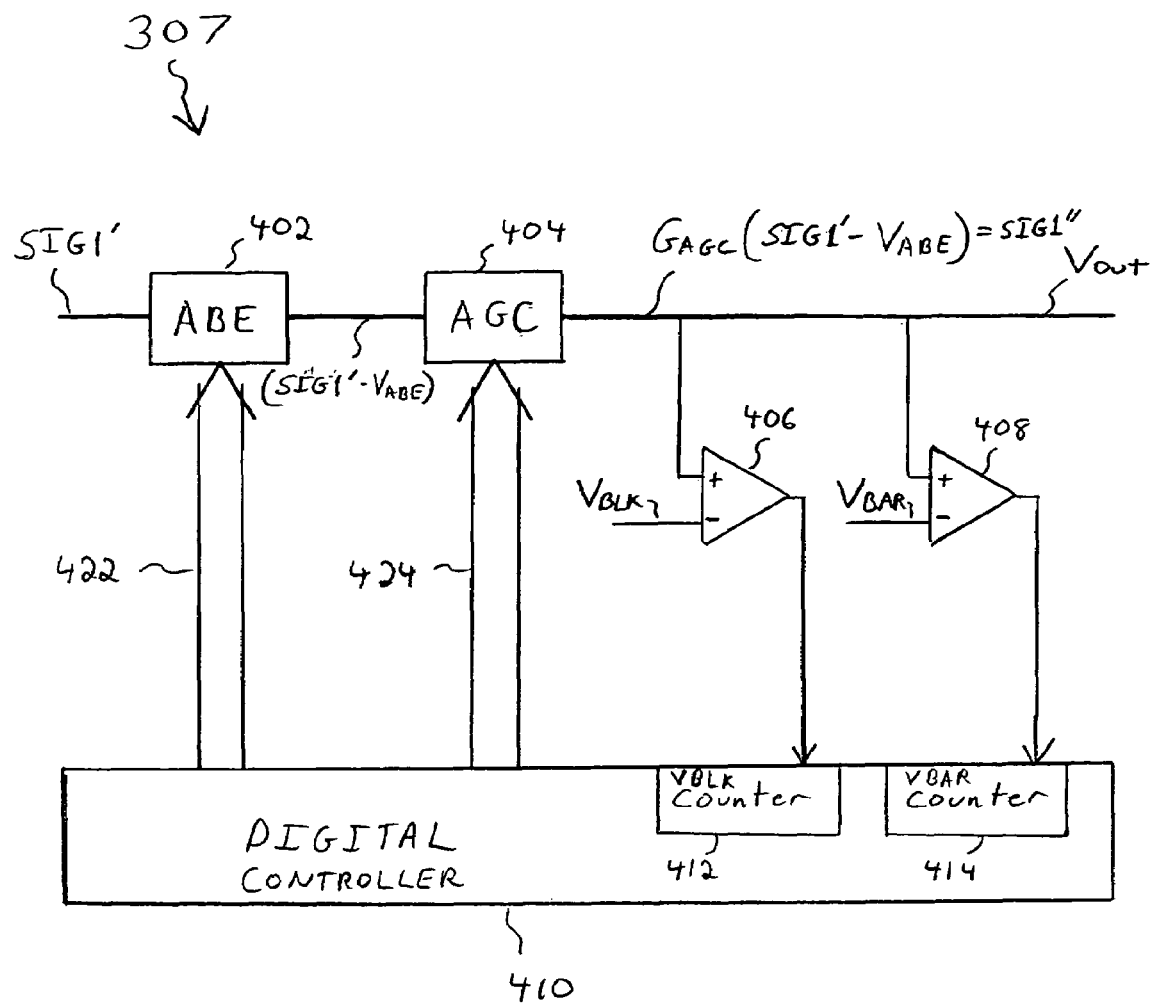
FIG. 3 is a schematic diagram of a black level calibration and automatic gain control processor according to the present invention.

With reference to FIG. 3, black level calibration and automatic gain control circuiting are shown for use in a single-chip CMOS imaging sensor. The automatic gain control amplification and black level calibration are performed according to the black level expansion method of the present invention. As will be explained in more detail below, the novel method auto black expansion uses a simplified digital control method for the signal processing. The black level calibration attempts to eliminate the portion of the signal that exists when no light is being detected, as is known in the art, thus allowing for a truer zero reference signal so that the later signal processing is improved. The automatic gain control amplifiers (AGC) amplify the signals at a controlled level for further processing.

As illustrated in FIG. 3, an auto black expansion circuit 402 performs the black level calibration and the automatic gain control circuit 404 performs the gain adjustment. A signal SIG1' is processed by the digitally controlled auto black expansion circuit 402. The auto black expansion circuit 402 shifts the voltage level of the signal SIG1' by a level voltage $V_{ABE}$. The output of the auto black expansion circuit 402 is then processed by a digitally controlled automatic gain control circuit 404. Both the auto black expansion circuit 402 and automatic gain control circuit 404 are analog circuits that are controlled by digital signals. Automatic gain control circuit 404 amplifies the input signal (SIG1'-$V_{ABE}$) according to a desired gain level $G_{AGC}$. The output signal level SIG1" is thus illustrated by the following equation.

$$SIG1''=(G_{AGC})(SIG1'-V_{ABE}) \tag{1}$$

Two comparators 406 and 408, and a digital controller 410, provide a digital control feedback loop for the auto black expansion circuit 402 and the automatic gain control circuit 404. The noninverting inputs of the comparators 406 and 408 each receive a signal SIG1" that is output from the automatic gain control circuit 404. The inverting input of the comparator 406 receives a desired black signal level $V_{BLK}$ while the inverting input of the comparator 408 receives a desired mid-level voltage $V_{BAR}$.

The outputs of the comparators 406 and 408 are provided to a digital controller 410. Digital controller 410 includes two counters 412 and 414. The output from comparator 406 is received by a counter 412, while the output from comparator 408 is received by a counter 414. Digital controller 410 provides a digital control signal 422 to auto black expansion circuit 402, and a digital control signal 424 to automatic gain control circuit 404. In a preferred embodiment, the digital control signals 422 and 424 are each 8-bit control signals.

Figure 1:
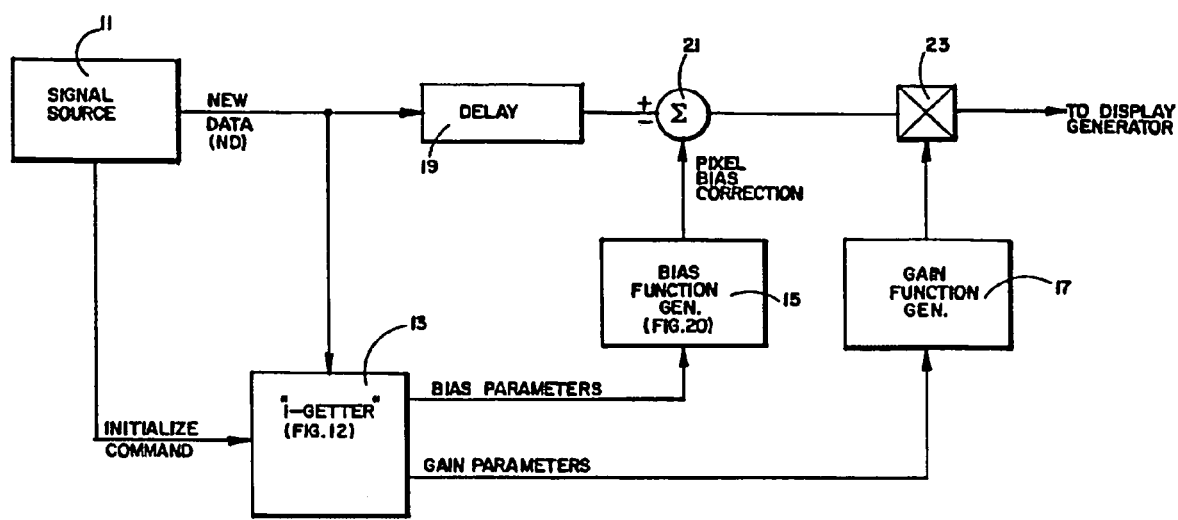
FIG. 1 is a schematic diagram of a prior art circuit for expanding the video contrast of an image.
Figure 2A:
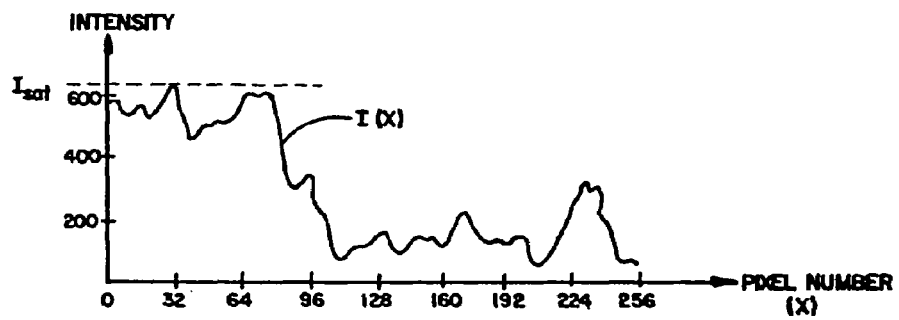
FIGS. 2A–2F are a series of timing diagrams illustrating the operation of the prior art circuit of FIG. 1.
Figure 2B:
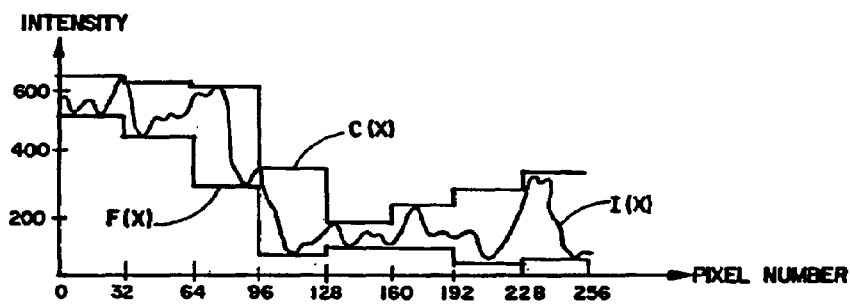
Figure 2C:
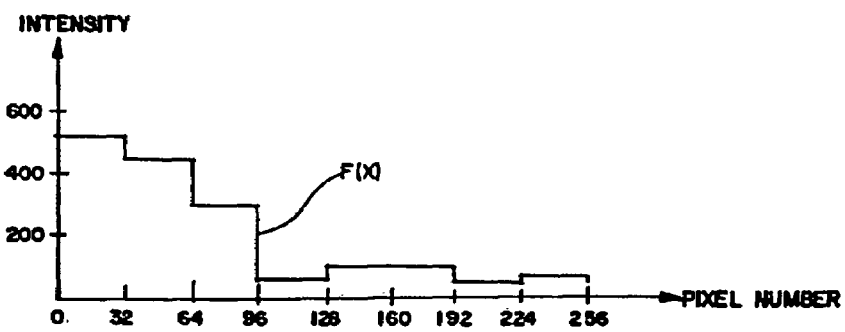
Figure 2D:
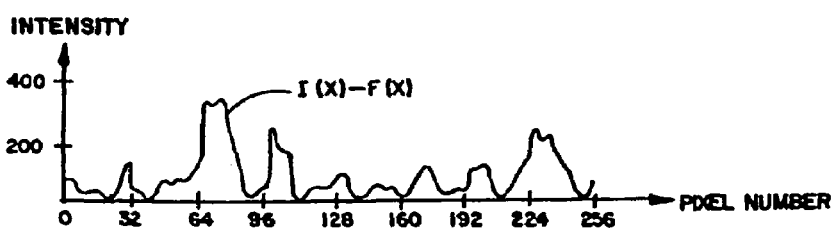
Figure 2E:
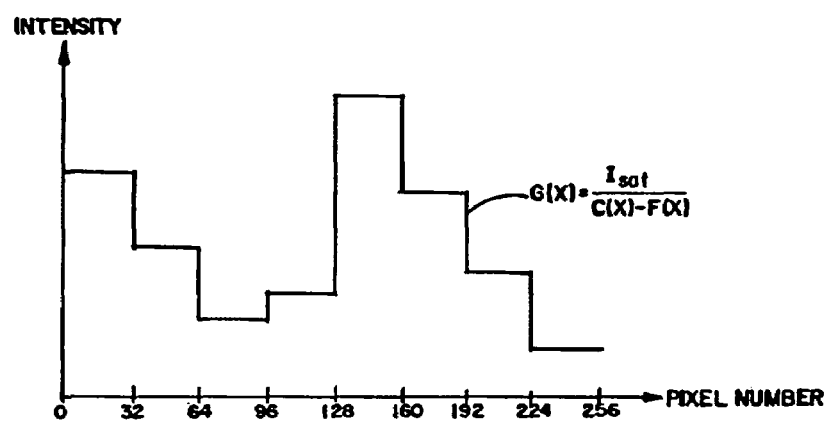
Figure 2F:
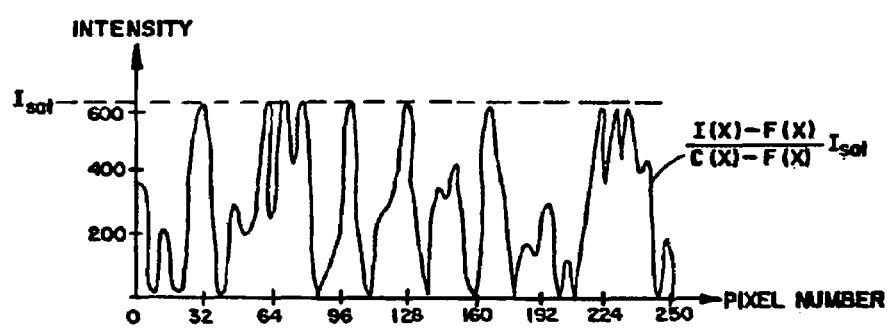
Figure 4A:
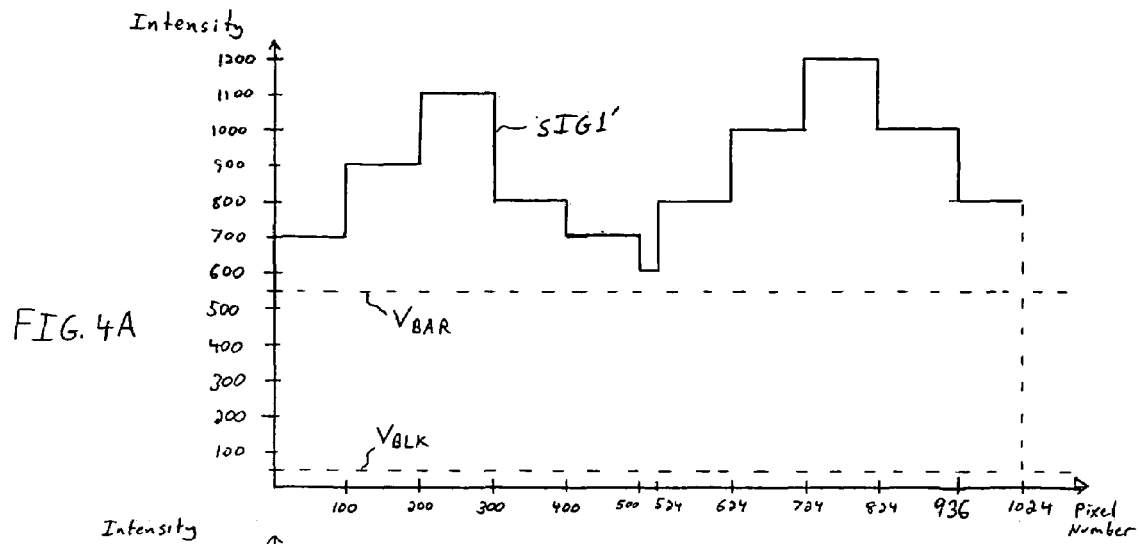
FIGS. 4A–4C are a series of timing diagrams illustrating the operation of the circuit of FIG. 3.
Figure 4B:
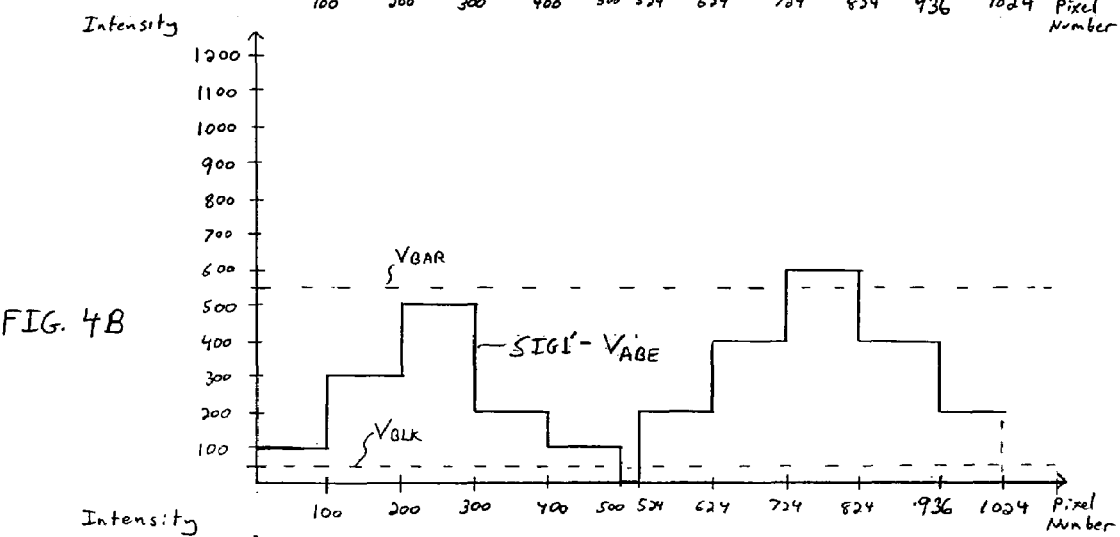
Figure 4C:
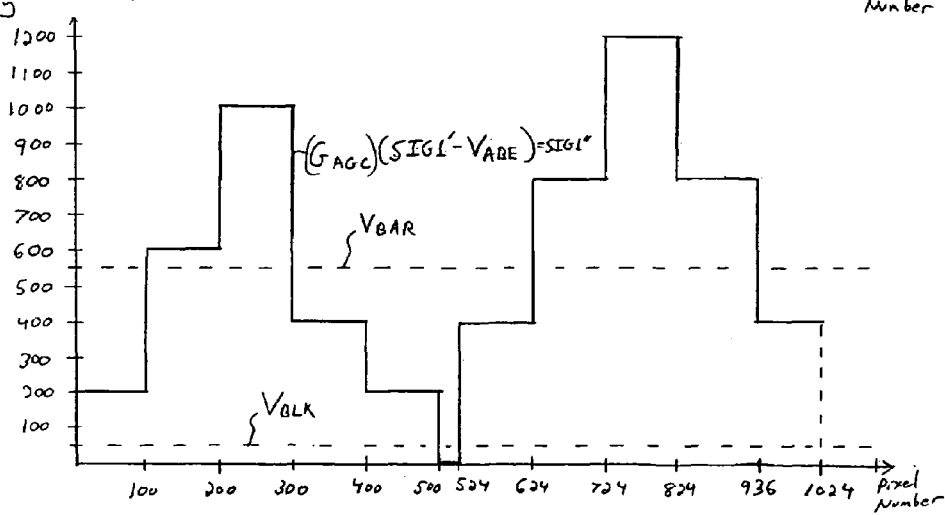

FIGS. 4A–4C are timing diagrams illustrating the general operation of the circuitry of FIG. 3. FIG. 4A is an intensity diagram similar to the intensity diagram illustrated in the prior art FIG. 2A. For illustrative purposes only, the pixel signals in FIG. 4A are provided in a step-function type format. It will be recognized that an actual intensity diagram would be much less uniform, such as that illustrated in FIG. 2A. The step-type format is intended only to simplify the following example with respect to the digital pixel counting method of the present invention.

FIG. 4A is illustrative of an entire field of 1024 pixels. It will be recognized that in an actual embodiment, a field may contain any number of pixels. The pixels of FIG. 4A have intensities according to the following table.

| Pixel Numbers | Intensity |
|---|---|
| 1–100 | 700 |
| 101–200 | 900 |
| 201–300 | 1100 |

-continued

| Pixel Numbers | Intensity |
|---|---|
| 301–400 | 800 |
| 401–500 | 700 |
| 501–524 | 600 |
| 525–624 | 800 |
| 625–724 | 1000 |
| 725–824 | 1200 |
| 825–936 | 1000 |
| 937–1024 | 800 |

FIG. 4A also illustrates a dotted-line level $V_{BLK}$ at a level of 50 and a mid-level voltage $V_{BAR}$ at a level of 550. The voltage level $V_{BLK}$ represents a desired black level to which the auto black expansion circuit 402 will shift the lower levels of the signal SIG1'. The level $V_{BAR}$ represents a desired mid-level for which the automatic gain control circuit 404 adjusts the amplification so that a certain number of processed pixel signals are above and below the desired mid-level. As will be described in more detail below, auto black expansion circuit 402 and automatic gain control circuit 404 are digitally controlled and only operate to shift the signal levels in between fields.

The digital controller 410 maintains a count of the number of adjusted pixels signals below the desired black level $V_{BLK}$ and the desired mid-level $V_{BAR}$. The desired number of adjusted pixel signals below the black level is designated as a number $N_{BLK}$, and the desired number of adjusted pixel signals below the mid-level are designated as a number $N_{BAR}$. In the example of FIG. 4A, the desired number of pixels $N_{BLK}$ below the signal level $V_{BLK}$ is equal to 24. The intensity diagram of FIG. 4A has been conveniently structured for purposes of the present example to have exactly 24 pixels (numbered 501–524) that are conveniently at a lower intensity level than the rest of the pixels.

As illustrated during the first field illustrated in FIG. 4A, there are no pixel signals below the desired black level $V_{BLK}$. Thus, through a process that will be described in more detail below, during the second field illustrated in FIG. 4B, the auto black expansion circuit 402 shifts the signal SIG1' down by an adjustment level $V_{ABE}$. As illustrated in FIG. 4B, this causes the intensity diagram of the second field (in which the sensed image is the same as that of FIG. 4A) to be level shifted down such that the pixels 501–524 are now below the desired black level $V_{BLK}$. As will be described in more detail below, rather than setting the number $N_{BLK}$ at a single number of acceptable pixels, a range may be set. For example, the acceptable range may be set to be above a selected lower number $N_{BLK1}$ (e.g., 16) and below a selected upper number $N_{BLK2}$ (e.g., 32).

The desired number $N_{BLK}=24$ pixels below the desired black level represent approximately 2.3% of the total 1024 pixels. In the preferred embodiment, the actual desired number of pixels below the black level $V_{BLK}$ is closer to 0.5%. In the example of FIG. 4B, the desired number of pixels below the black level $V_{BLK}$ was achieved in a single shift between fields, however, in an actual embodiment, several level shifts, both up and down, may be required to achieve the desired number of adjusted pixel signals below the desired black level $V_{BLK}$.

Once the desired number of adjusted pixel signals below the black level $V_{BLK}$ has been achieved, the gain is adjusted by the automatic gain control circuit 404 so as to raise the approximate mid-level intensity to the desired mid-level $V_{BAR}$, as illustrated in FIG. 4C. As illustrated in FIG. 4C, during the third field, the intensities of the signals of FIG. 4B have been amplified by a level of approximately X 2. In an actual embodiment where, for example, some of the pixels 501–524 might not all be at the zero intensity level, some of them might be amplified to be above the desired black level $V_{BLK}$, thus shifting the digital count in counter 412, and requiring further adjustment of the adjustment level $V_{ABE}$ in future fields. One of the advantages of the method of the present invention is that as long as the same objects and intensities remain in the image field, approximately the same number of pixels at a given intensity should remain, and the level $V_{ABE}$ and the gain $G_{AGC}$ should not require further adjustment.

The intensities of the pixels of FIG. 4C are at levels according to the following table:

| Pixel Numbers | Intensity |
|---|---|
| 1–100 | 200 |
| 101–200 | 600 |
| 201–300 | 1000 |
| 301–400 | 400 |
| 401–500 | 200 |
| 501–524 | 0 |
| 525–624 | 400 |
| 625–724 | 800 |
| 725–824 | 1200 |
| 825–936 | 800 |
| 937–1024 | 400 |

Thus, as illustrated in FIG. 4C, with respect to the desired mid-intensity level $V_{BAR}$ which is set at 550, approximately 512 pixels are above the desired mid-level, while approximately 512 pixels are below the desired mid-level. In the present example, the desired number of pixels $N_{BAR}$ below the desired mid-level $V_{BAR}$ is set to be 512, so that as long as the same pixel level intensities remain in future fields (e.g., objects moving within the fields but not leaving the image), the gain level $G_{AGC}$ will not require further adjustment. As will be described in more detail below, as the sensed image changes, the voltage level $V_{ABE}$ and the gain level $G_{AGC}$ may be adjusted in between fields according to the method of the present invention.

The number $N_{BAR}$ may represent a median value, as in the present example, or may be set at a different number. Also, similar to as was described above for the number $N_{BLK}$, the desired number of pixels $N_{BAR}$ for the number of pixels below the desired mid-level may also be set as a range rather than a single number. For example, the desired number of pixels may be set to be above a lower number $N_{BAR1}$ (e.g., 504) and below an upper number $N_{BAR2}$ (e.g., 520).

Figure 5A:
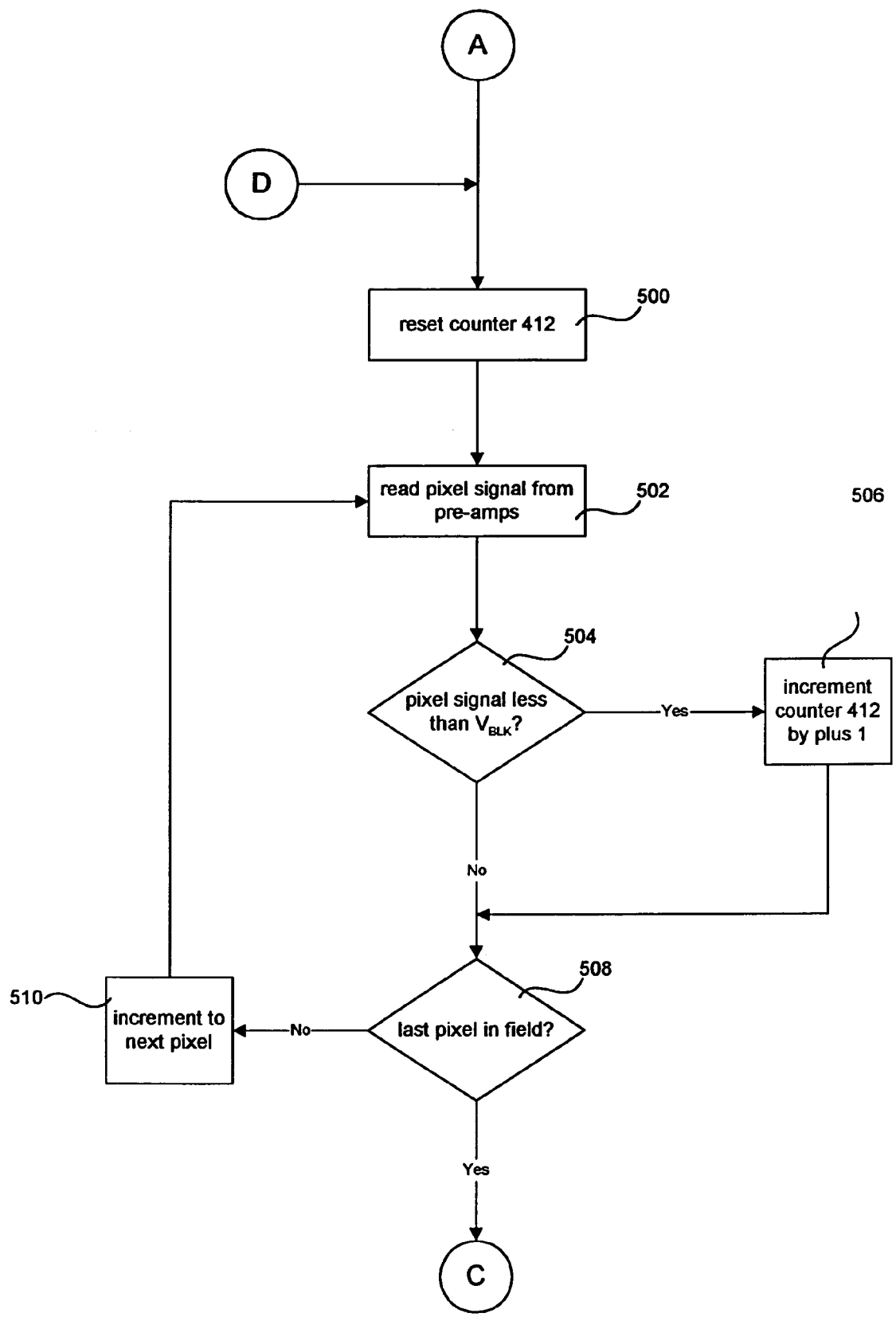
FIGS. 5A–5C are a series of flow diagrams illustrating the method of the present invention.
Figure 5B:
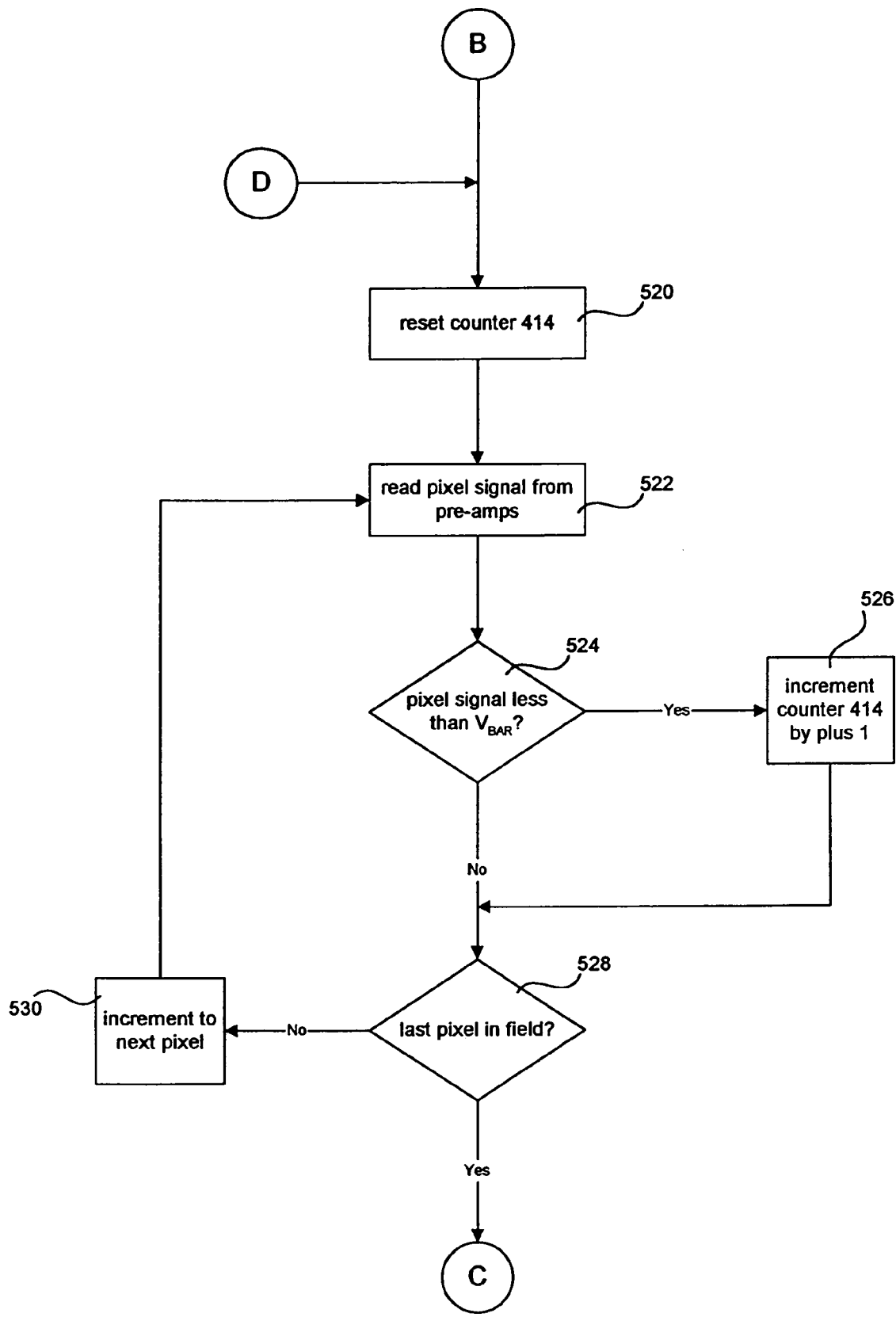
Figure 5C:
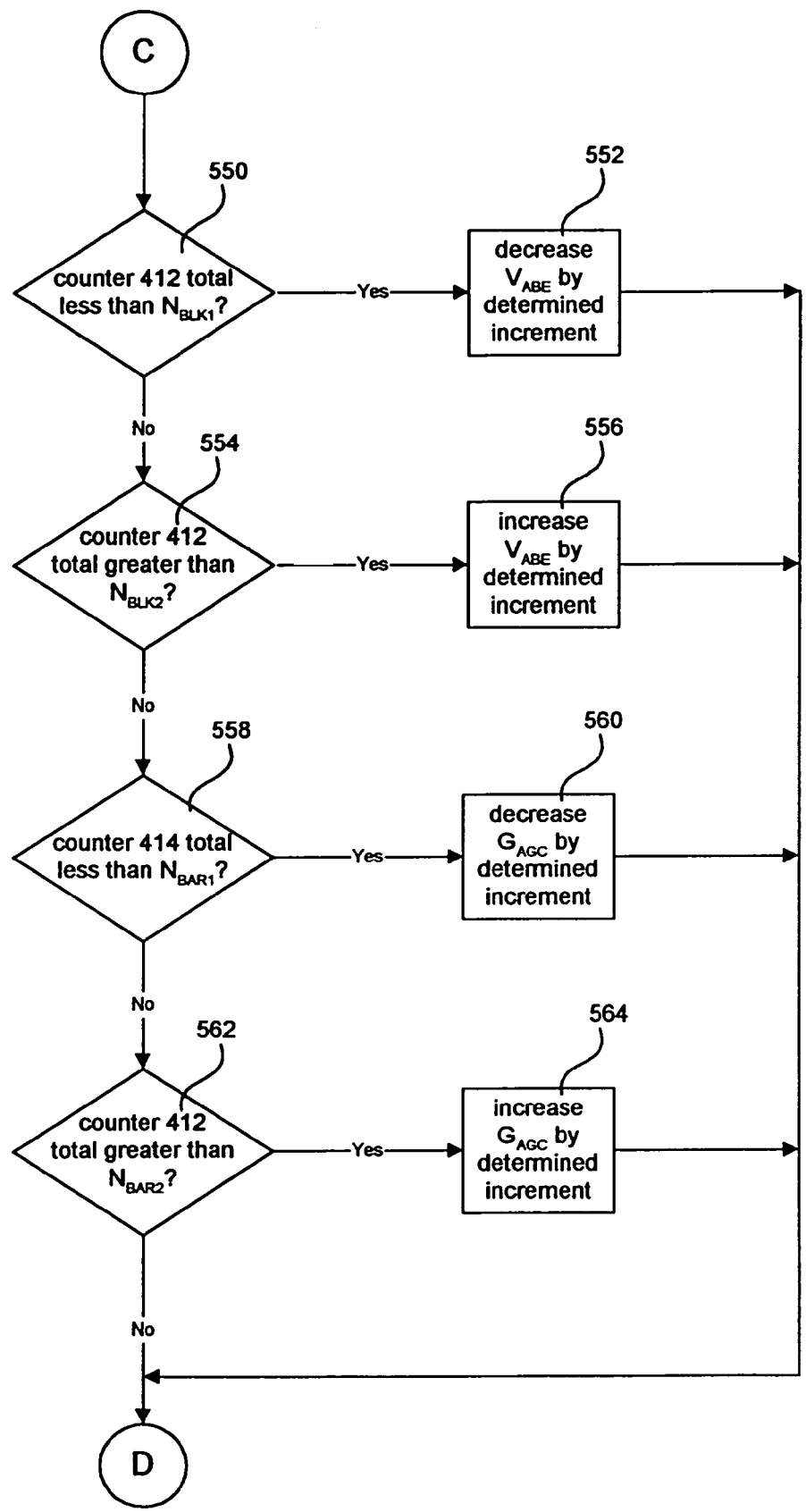

FIGS. 5A to 5C are flow diagrams further illustrating the method of the present invention. As illustrated in FIG. 5A, at a point A, a new field begins, and at a block 500 the counter 412 is reset. At a block 502, a first processed pixel signal is read as part of the signal SIG1". At a decision block 504, comparator 406 outputs a signal indicating whether the processed pixel signal SIG1" is less than signal level $V_{BLK}$. If the signal SIG1" is less than the signal $V_{BLK}$, the comparator 406 will output a low signal, and at a block 506, counter 412 will be incremented by +1. If the signal SIG1" is not less than the signal $V_{BLK}$, the comparator 406 will output a high signal, and the routine will continue to a decision block 508.

At decision block 508, a determination is made as to whether the most recent pixel signal came from the last pixel of the field. This determination is most likely made according to a timing control signal (not shown) from the main processing circuitry of the system. If the pixel signal was not the last pixel from the field, at a block 510, the routine increments to the next pixel and returns to block 502 to read the next pixel signal as part of the processed pixel signal SIG1". If the last pixel in the field has been read, the routine proceeds to a point C, that will be described in more detail below with respect to FIG. 5C.

FIG. 5B illustrates a process similar to that of FIG. 5A. In the preferred embodiment, the routines of FIGS. 5A and 5B are run simultaneously, although in an alternate system parts or all of the routines could be run sequentially. As illustrated in FIG. 5B, at the beginning of a field at a point B, counter 414 is reset at a block 520. At a block 522, the processed pixel signal from processed signal SIG1" is received by comparator 408. At a decision block 524, the comparator 408 outputs a signal that indicates whether the processed pixel signal has a value less than the desired mid-level $V_{BAR}$. If the processed pixel signal is less than the level $V_{BAR}$, the comparator 408 outputs a low signal, and at a block 526, counter 414 will be incremented by +1. If the processed pixel signal is not less than the level $V_{BAR}$, the comparator 408 outputs a high logic level, and the routine proceeds to a decision block 528.

At decision block 528, a determination is made as to whether the last pixel in the field has been read. If the last pixel in the field has not been read, the routine proceeds to a block 530 where the routine increments to the next pixel and returns to block 502 to read the next processed pixel signal. If the last pixel in the field has been read, the routine proceeds to a point C that will be described in more detail below with respect to FIG. 5C.

As illustrated in FIG. 5C, from a point C, the routine proceeds to a decision block 550. At decision block 550, digital controller 410 determines whether the counter 412 number of pixels counted below the level $V_{BLK}$ is less than a desired number $N_{BLK1}$. The number $N_{BLK1}$ represents a desired threshold number of pixels below which adjustment of the level $V_{ABE}$ is desired to shift the overall level of the intensity diagram, as was illustrated in the shift between FIGS. 4A and 4B. If the counter 412 total is less than the number $N_{BLK1}$, the routine proceeds to a block 552, where the level $V_{ABE}$ is decreased by a determined increment, and the routine proceeds to a point D. The determined increment may be fixed or may be based in part on the difference between the counter 412 total and the number $N_{BLK1}$, or some similar algorithm indicating the magnitude of the desired shift. If the counter 412 total is not less than the number $N_{BLK1}$, the routine proceeds to a decision block 554.

At decision block 554, the routine determines whether the counter 412 total is greater than a number $N_{BLK2}$. The number $N_{BLK2}$ represents a desired threshold number of pixels in counter 412 above which an upward increase adjustment of the level $V_{ABE}$ is desired. The number $N_{BLK2}$ may be the same as the number $N_{BLK1}$. If the counter 412 total is greater than the number $N_{BLK2}$, at a block 556, the level $V_{ABE}$ is increased by a determined increment, and the routine proceeds to a point D. The determined increment may be fixed or may be based in part on the difference between the counter 412 total and the number $N_{BLK2}$, or some similar algorithm indicating the magnitude of the desired shift. If the counter 412 total is not greater than the number $N_{BLK2}$, then the routine proceeds to a decision block 558.

The process for adjusting the gain $G_{AGC}$ begins at decision block 558. It should be noted that the gain $G_{AGC}$ is only adjusted once it has been determined through blocks 550–556 that the level $V_{ABE}$ has already been adjusted to an acceptable level.

At decision block 558, the digital controller 410 determines whether the counter 414 total is less than a desired number $N_{BAR1}$. The number $N_{BAR1}$ represents a desired threshold number of pixels below the level $V_{BAR}$, below which a decrease in the gain $G_{AGC}$ is desired. If the counter 414 total is less than the number $N_{BAR1}$, the routine proceeds to block 560, where the gain $G_{AGC}$ is decreased by a determined increment, and the routine proceeds to a point D. The determined increment may be fixed or may be based in part on the difference between the counter 414 total and the number $N_{BAR1}$, or some similar algorithm indicating the magnitude of the desired adjustment. If the counter 414 total is less than the number $N_{BAR1}$, then the routine proceeds to a decision block 562.

At decision block 562, the digital controller 410 determines whether the counter 414 total is greater than a threshold number $N_{BAR2}$. The number $N_{BAR2}$ represents a threshold number of pixels above which an increase in the gain $G_{AGC}$ is desired. If the counter 414 total is greater than $N_{BAR2}$, the routine proceeds to a block 564 where the gain $G_{AGC}$ is increased by a determined increment and the routine proceeds to a point D. The determined increment may be fixed or may be based in part on the difference between the counter 414 total and the number $N_{BAR2}$, or some similar algorithm indicating the magnitude of the desired shift. If the counter 414 total is not greater than the number $N_{BAR2}$, the routine proceeds to a point D. The point D is illustrated in FIGS. 5A and 5B as a starting point for those routine at the beginning of a new field.

It will be appreciated that the greatest advantage of the auto black expansion and automatic gain control system of the above-described invention is that it is operated with a simplified digital control method that is faster, more accurate, and requires fewer circuit components than prior art methods. By utilizing a digital count of the number of pixels below selected levels, the speed of processing is increased, and the required circuit components are reduced to a comparator and a counter. In addition, by using an 8-bit or higher control signal, precise adjustments can be made to the analog black level adjustment and automatic gain control circuits. In addition, by making the adjustments between the fields after the pixel counts have been completed, the timing of the adjustments are simplified and the chances for errors in mid-field adjustments are reduced. In addition, completely linear amplification is achieved within a given field.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for auto black expansion in an image sensor, comprising:
    (a) comparing the voltage level of processed pixel signals with a first set voltage level;
    (b) maintaining a first count of a number of pixel signals that are above or below the first set voltage level;
    (c) using the count to determine a first digital control signal for adjusting the black level calibration of the processed pixel signals; and
    (d) comparing the pixel signals to a second set voltage level different from said first set voltage level and maintaining a second count related to the comparison of the pixel signals to the second level, wherein the second count is used to determine a second digital control signal for adjusting the amplification of the processed pixel signals.

2. The method of claim 1, wherein the adjustments to the black level calibration are made in between fields of pixel signals.

3. The method of claim 1, wherein the digital control signal comprises 8-bits.

4. The method of claim 1, wherein adjustments to the amplification of the processed pixel signals are only made after adjustments to the black level calibration have adjusted the pixel signals to a desired voltage level.

5. An image sensor for processing image signals that are comprised of processed pixel signals, the image sensor comprising:
   (a) auto black expansion circuitry for adjusting the relative voltage level of the image signal;
   (b) a black level voltage input;
   (c) a comparator, the comparator comparing the processed pixel signals to a desired black level signal;
   (d) a counter for maintaining a count related to the comparison performed by the comparator;
   (e) a digital controller for utilizing the count maintained by the counter to determine desired adjustments to the auto black expansion circuitry; and
   (f) a mid-level voltage input different from said black level voltage input, and a second comparator for comparing the processed pixel signals to the mid-level voltage input; and
   (g) automatic gain control circuitry, wherein the digital controller utilizes the count of a second counter to determine adjustments to the automatic gain control circuitry.

6. The image sensor claim 5, wherein the adjustments to the auto black expansion circuitry are made in between fields of pixel signals.

* * * * *

UNITED STATES PATENT AND TRADEMARK OFFICE
CERTIFICATE OF CORRECTION

| | |
|---|---|
| PATENT NO. | : 7,046,278 B1 |
| APPLICATION NO. | : 09/399510 |
| DATED | : May 16, 2006 |
| INVENTOR(S) | : Dong et al. |

It is certified that error appears in the above-identified patent and that said Letters Patent is hereby corrected as shown below:

Column 12
Line 14, "image sensor claim 5," should be --image sensor of claim 5,--;

Signed and Sealed this

First Day of August, 2006

JON W. DUDAS
*Director of the United States Patent and Trademark Office*